Oct. 19, 1954  J. H. WINCHESTER ET AL  2,691,798
MOLDING APPARATUS

Filed Feb. 13, 1950                             2 Sheets-Sheet 1

INVENTORS
JOHN H. WINCHESTER AND
BY MARVIN ACHTERHOF
Oberlin & Limbach
ATTORNEYS.

Oct. 19, 1954   J. H. WINCHESTER ET AL   2,691,798
MOLDING APPARATUS
Filed Feb. 13, 1950   2 Sheets-Sheet 2

INVENTORS
JOHN H. WINCHESTER AND
BY MARVIN ACHTERHOF
Oberlin & Limbach
ATTORNEYS.

Patented Oct. 19, 1954

2,691,798

UNITED STATES PATENT OFFICE 2,691,798

MOLDING APPARATUS

John H. Winchester, Euclid, and Marvin Achterhof, Willoughby, Ohio, assignors, by mesne assignments, to The Eagle-Picher Company, Cincinnati, Ohio, a corporation of Ohio Application February 13, 1950, Serial No. 143,988

2 Claims. (Cl. 18—19)

This invention relates as indicated to molding apparatus, and more particularly to an apparatus for molding thermoplastic sheet materials.

One method successfully employed in the molding of rubber mats and similar articles is to place a blank or sheet of the plastic uncured rubber composition upon the upturned face of a metal mold and then to draw such sheet of plastic material tightly against the mold face by means of suction applied thereto. The molded article is cured, as by vulcanization, and stripped from the mold. The primary factor limiting the rate of production is, of course, the time required for such curing or vulcanizing step.

Thermoplastic sheet materials such as the vinyl resins, for example, do not require a curing or vulcanizing operation to be performed thereon but take the desired set when merely cooled.

When vinyl sheets are cold, however, they are relatively stiff and cannot be made to conform to a mold surface. When heated they become readily moldable but very difficult to handle (i. e. to place on the mold, for example) since they become gummy and stretch very readily. It has therefore been the usual practice when molding such vinyl sheet or similar thermoplastic material to place the stiff cold sheets upon the mold and then to heat the mold to soften the sheets to moldable condition. After completion of the molding operation, the mold and the molded article therein must then be cooled before such article can be removed. This heating and cooling cycle is, of course, quite time-consuming and expensive.

It is accordingly a primary object of our invention to provide an apparatus for molding thermoplastic sheet material such as the vinyl resins which will be very expeditious and inexpensive.

Another object is to provide such apparatus employing a relatively cool mold but avoiding the necessity of handling heated thermoplastic sheet material by the operator.

A further object is to provide apparatus employing an inverted suction mold wherein the suction is employed not only to cause the sheet material to conform to the mold cavity but also makes possible the employment of such inverted mold as transfer means.

Still another object is to provide apparatus largely automatic in operation adapted continuously to repeat the molding cycle.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
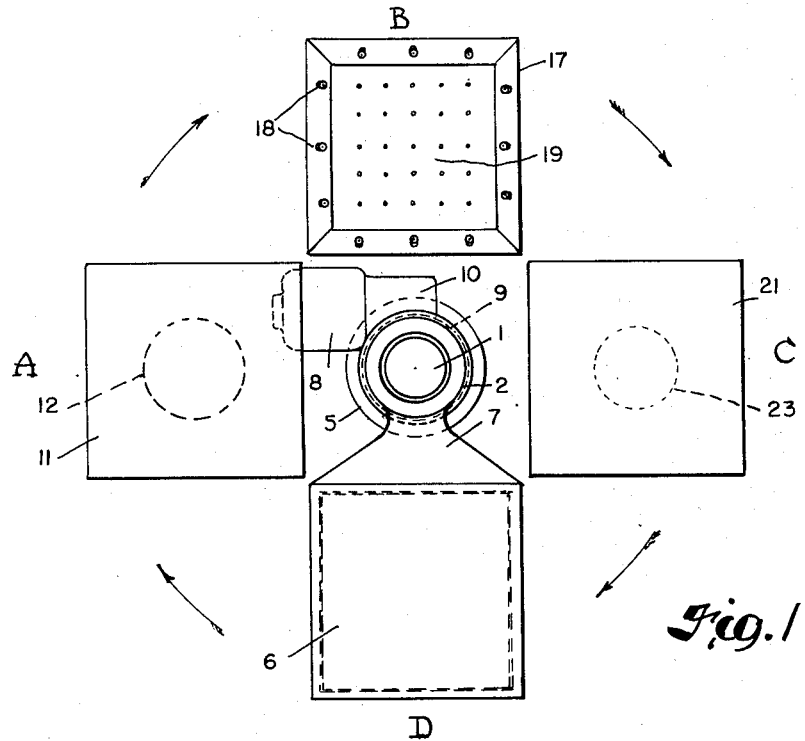
Fig. 1 is a top plan view of one form of apparatus adapted to be employed in carrying out our invention.
Figure 2:
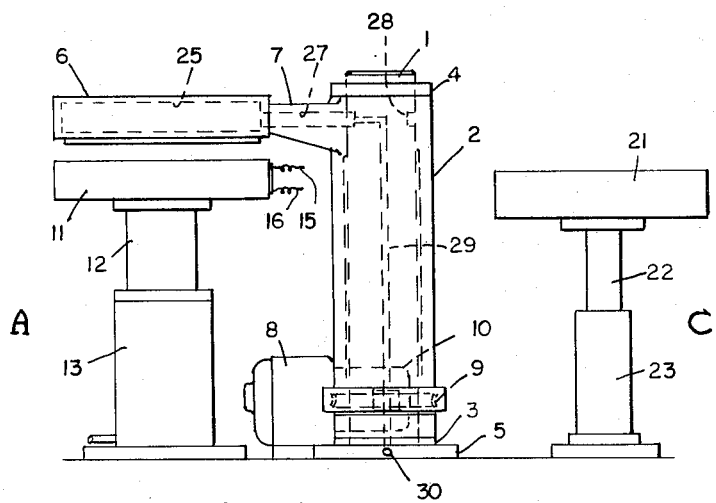
Fig. 2 is an elevation of certain elements of such apparatus but showing the mold swung to a different position.
Figure 3:
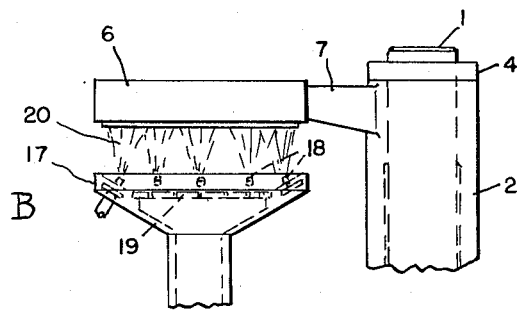
Fig. 3 is a fragmentary elevational view showing the mold swung to still another station.

Referring now more particularly to said drawing and especially Figs. 1–3 thereof, one form of apparatus suitable for practicing our invention is there illustrated comprising a vertical column or upright 1 having an outer cylindrical shell or sleeve 2 mounted for rotation thereon. Such cylindrical sleeve 2 will be journalled between lower thrust bearing 3 and upper bearing 4 and will be internally relieved except adjacent its upper and lower ends to reduce the area of contact with column 1. Such column may in turn be mounted upon a base or pedestal 5 adapted to be rigidly secured to a proper foundation. An inverted suction mold 6, described in greater detail below, is carried by arm 7 extending horizontally from the upper end of tubular sleeve 2. Such sleeve is adapted to be rotated on column 1 by means of electric motor 8 driving worm gear 9 through speed reducer 10 to swing mold 6 in a clockwise direction as viewed in Fig. 1 to be successively indexed at stations A, B, C, D (Fig. 1). A work supporting table or platen 11 is supported at station A on a vertically disposed fluid pressure piston-cylinder assembly comprising piston 12 and cylinder 13 whereby such platen may be raised and lowered in timed relation to such indexing of mold 6. The upper surface of such platen may be heated electrically by means of resistance coils 14 (Fig. 4) through leads 15, 16, connected to a suitable current source.

At station B 90° removed from station A is a spray fountain 17 provided with a plurality of nozzles 18 arranged around the perimeter of a central drain 19. As shown in Fig. 3, a cooling spray 20 is adapted to be directed from nozzles 18 against the underside of mold 6 when the latter has been indexed to the station B position.

Ninety degrees beyond station B a delivery table 21 is positioned mounted upon a vertically disposed fluid pressure piston-cylinder assembly including piston 22 and cylinder 23 adapted to receive the finished molded articles deposited thereon and to be progressively lowered as such articles accumulate. Delivery tables of this general type are, of course, well known in the art and commercially available. Their precise construction therefore forms no part of the present invention, it only being noted that such delivery tables are commonly designed to be automatically lowered in order to maintain the top of the stack of articles thereon at a constant level. Instead of a delivery table, various alternative devices may be provided such as a delivery conveyor, a delivery chute, or basket.

At station D no work is ordinarily performed but the mold will be inspected by the operator positioned near platen 11 to make sure that the previously molded article has been properly discharged from the mold and that the latter is now ready to repeat the cycle.

Figure 4:
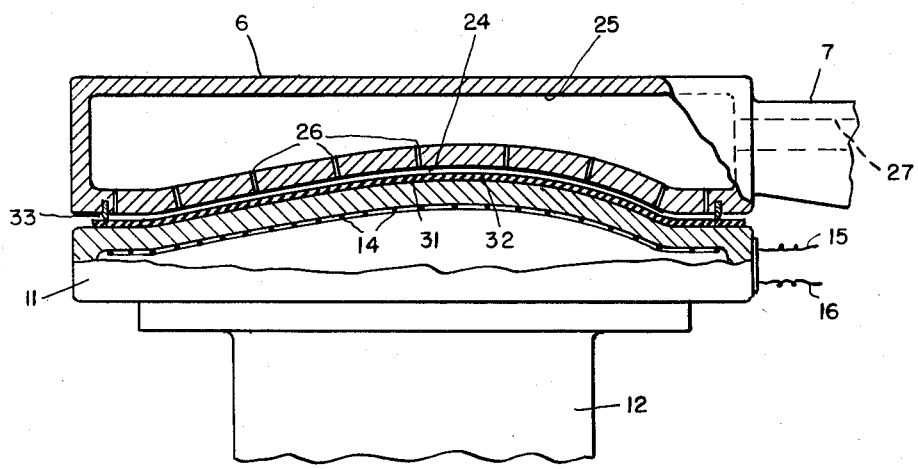
Fig. 4 is an enlarged detail view partly in section showing the internal construction of the mold and complementary stock supporting platen.

Referring now to Fig. 4 of the drawing, there is there shown for purposes of illustration a mold 6 having a downwardly disposed mold face 24 which may be concave in conformation in order to produce a correspondingly shaped mat or like article. It will also be appreciated, of course, that such mold surface may be embossed or engraved with a suitable design to impart complementary surface detail to the molded article. Mold 6 includes an inner chamber or cavity 25 communicating with the mold face through a number of small vents or passages 26 distributed throughout the under surface of such mold. A passage 27 leads through arm 7 to the inner surface of sleeve 2 where it communicates with an annular groove 28 in the outer periphery of column 1 (Fig. 2). Column 1 is cored to provide a vertical passage 29 leading from such groove to outlet 30 in base 5 whereby a vacuum may be induced in chamber 25 or fluid under pressure supplied thereto as desired.

Figure 5:
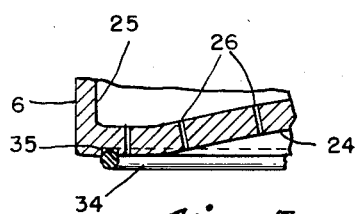
Fig. 5 is a fragmentary detail view in cross-section illustrating still another modification in the mold construction.

As shown in Fig. 4, the upper surface 31 of platen 11 may be contoured substantially to complement mold surface 24 and thereby to present the sheet of thermoplastic material 32 resting thereon uniformly to the mold surface. A peripheral sealing rib is provided surrounding mold surface 24 in order that when vacuum is developed within chamber 25 the plastic sheet 32 may be drawn against the mold surface. As described more in detail in the co-pending application of William Bertleff and Leon E. Hoffer, Serial No. 143,454, filed February 10, 1950, such peripheral rib may comprise a downwardly projecting knife edge 33 which may be caused to enter and substantially penetrate the plastic sheet material when platen 11 is elevated. Not only is the desired seal thereby obtained, but the plastic sheet will be trimmed thereby so that the flash may later be stripped from the completed molded article with little effort. In Fig. 5 there is illustrated a modified form of seal comprising a resilient rubber rib 34 of circular cross-section seated and cemented in a shallow peripheral groove 35 surrounding the mold surface. While not as effective as a trimming means as knife 33, such rib makes an excellent seal and militates against possible damage to rib, mold and platen should reciprocation of the latter be improperly adjusted.

The operation of our new apparatus is believed readily apparent from the foregoing description. A sheet or blank of relatively stiff thermoplastic material such as the usual vinyl resins employed for molding purposes is placed by the operator on the upper surface of heated platen 11. The cycling of mold section 6 may either be automatic with such mold section being indexed to the designated stations at timed intervals, or such indexing may be under direct control of the operator as desired. After the sheet 32 has been heated to the desired temperature on platen 11 to render the same easily moldable, the mold 6 is indexed thereover (Fig. 2) and fluid pressure piston-cylinder assembly 12, 13, actuated to elevate platen 11 to bring such sheet closely adjacent mold surface 24 (Fig. 4). If a peripheral knife edge 33 is employed as shown in Fig. 4, such piston-cylinder assembly will be adjusted to elevate platen 11 so that such knife edge penetrates into sheet 32 without quite contacting the upper surface 31 of the platen. Suction is then applied to inner mold chamber 25 to draw the now plastic sheet 32 firmly against mold surface 24, thereby forming such sheet into desired contour and embossing the desired design thereon. The application of suction to the plastic sheet likewise tends to cause knife edge 33 still further to penetrate the same so that only a thin web remains connecting the peripheral flash with the molded article proper.

Platen 11 is now lowered as necessary to avoid interference with mold 6, and the latter is indexed to station B over drain 19. A cooling water spray from nozzles 18 is thereupon directed against the underside of molded sheet 32 to cool the same and cause the molded article to harden or set. Instead of a water spray, other cooling media may be employed such as jets of compressed air, for example. When the molded article has sufficiently set, the supply of the cooling medium is cut off and mold 6 is indexed to delivery station C above delivery table 21. Chamber 25 in mold 6 is then vented to atmosphere to permit the molded article to be deposited upon delivery table 21 and, if necessary or desired, compressed air may be admitted through line 30 to assist in ejecting the molded article from the mold. While these latter operations have been going on, the operator has in the meantime placed a new sheet upon platen 11 to be softened prior to repetition of the cycle.

After the molded article has been deposited upon delivery table 21, mold 6 resumes its clockwise travel as shown in Fig. 1, with or without a stop at station D depending upon the time required to soften the next sheet of thermoplastic material on platen 11. At this time the operator will inspect mold 6 to be sure that the molded article has been properly ejected and deposited on table 21, and if such article still adheres to the mold he will manually strip the same. During travel of the mold from station C to station A, such mold may also be somewhat heated if desired, as by introduction of steam to chamber 25, but ordinarily the heating of the thermoplastic sheet on platen 11 will suffice to render the same properly moldable.

It will be seen from the foregoing that our inverted suction mold serves several purposes. It lifts the sheet of plastic material from the platen, performs the molding operation proper, and transfers the molded article. Obviously, the movements of certain elements may be reversed to obtain the same results. Thus the inverted mold may be held stationary while the heating platen, cooling spray, and delivery table revolve or reciprocate therebeneath. Or the mold may be mounted for vertical reciprocation rather than such platen.

The relative vertical reciprocation of platen and mold may be utilized in performing the actual molding operation, the suction serving the purpose of retaining the molded article in the cooler upper mold section. The peripheral rib 33 or 34 will then not ordinarily be required. For most purposes, however, a relatively cool upper suction mold and a lower, generally complementary, heated platen will suffice. By retaining the molded article in the cool upper mold the heated platen need not itself be cooled but may at once be withdrawn and employed to soften the next blank.

The electric heating means for such platen may desirably be provided with a thermostat control to maintain optimum temperature. Other heating media such as steam may be employed instead of such electric heating means. The indexing of the mold travel, operation of valves, etc., may be timer controlled, the various stages of the cycle being regulated in accordance with the requirements of the particular thermoplastic material employed and the article made therefrom. In some instances the cooling spray or equivalent may be dispensed with, as when very thin sheet material is being molded which hardens promptly after the molding operation.

Among the thermoplastic materials suitable for use in accordance with our invention are included:

Polyethylene resins
Polystyrene resins
Poly-acrylic resins
Nitro-cellulose
Cellulose acetate
Vinyl butyrates When using a complementary contoured platen as shown in Fig. 4, the thermoplastic sheet material, upon being softened, conforms thereto, so that in a sense a preliminary molding operation is thus performed prior to contact with the downturned mold face overhead. Such pre-forming is especially desirable when relatively thin sheet stock is employed since it prevents undue stretching of the sheet and the formation of occasional folds therein when drawn into the overhead mold.

Certain rubber compositions, being also thermoplastic, may desirably be somewhat heated and then molded in a mold having a lower temperature than such composition. Of course, if the usual vulcanizing ingredients are contained therein, the material should be promptly molded before the same take effect. Or an unheated platen may be employed, where the composition is initially sufficiently plastic, to move the plastic sheet into operative position relative to the inverted suction mold.

Other modes of applying the principle of the invention may be employed, change being made as regards the details described, provided the features stated in any of the following claims or the equivalent of such be employed.

We therefore particularly point out and distinctly claim as our invention:

1. In molding apparatus for molding thermoplastic sheet material, a downturned suction mold, a lower platen adapted to support a sheet of such material thereon, means operative to heat said platen, means operative relatively to reciprocate said mold and platen vertically toward and away from one another, means mounting said mold and platen for relative lateral movement, and means operative to direct a fluid cooling medium toward the face of said mold when thus laterally removed from said platen.

2. In molding apparatus for molding thermoplastic sheet material, a downturned suction mold having a peripheral knife edge about its molding surface, a lower platen adapted to support a sheet of such material thereon, means operative to heat said platen, means operative relatively to reciprocate said mold and platen vertically toward and away from one another, means mounting said mold and platen for relative lateral movement, and means operative to direct a fluid cooling medium toward the face of said mold when thus laterally removed from said platen.

References Cited in the file of this patent

UNITED STATES PATENTS

| Number | Name | Date |
|---|---|---|
| Re. 23,171 | Borkland | Nov. 29, 1949 |
| 673,982 | Hamet | May 14, 1901 |
| 1,388,124 | Roberts | Aug. 16, 1921 |
| 1,560,862 | Roberts | Nov. 10, 1925 |
| 1,737,874 | Busch | Dec. 3, 1929 |
| 1,821,413 | Whitehouse | Sept. 1, 1931 |
| 2,234,839 | Edwards | Mar. 11, 1941 |
| 2,422,979 | Pecker | June 24, 1947 |
| 2,446,041 | Blanchard | July 27, 1948 |
| 2,478,165 | Collins | Aug. 2, 1949 |
| 2,493,439 | Braund | Jan. 3, 1950 |
| 2,495,640 | Muskat | Jan. 24, 1950 |
| 2,517,701 | Oettinger, Jr. | Aug. 8, 1950 |